(12) United States Patent
Kagoshima

(10) Patent No.: US 10,579,327 B2
(45) Date of Patent: Mar. 3, 2020

(54) SPEECH RECOGNITION DEVICE, SPEECH RECOGNITION METHOD AND STORAGE MEDIUM USING RECOGNITION RESULTS TO ADJUST VOLUME LEVEL THRESHOLD

(71) Applicant: KABUSHIKI KAISHA TOSHIBA, Minato-ku, Tokyo (JP)

(72) Inventor: Takehiko Kagoshima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 15/705,134

(22) Filed: Sep. 14, 2017

(65) Prior Publication Data

US 2018/0275951 A1   Sep. 27, 2018

(30) Foreign Application Priority Data

Mar. 21, 2017   (JP) .................................. 2017-054907

(51) Int. Cl.
```
G10L 15/20      (2006.01)
G10L 15/22      (2006.01)
B60Q 9/00       (2006.01)
G06F 3/16       (2006.01)
G10L 25/78      (2013.01)
```

(52) U.S. Cl.
CPC .............. *G06F 3/165* (2013.01); *G06F 3/167* (2013.01); *G10L 15/20* (2013.01); *G10L 15/22* (2013.01); *G10L 25/78* (2013.01); *B60Q 9/007* (2013.01); *G10L 2015/223* (2013.01); *G10L 2015/225* (2013.01); *G10L 2025/786* (2013.01)

(58) Field of Classification Search
CPC .......... G10L 15/20; G10L 15/22; B60Q 9/007

USPC .......................................................... 704/233
See application file for complete search history.

(56) References Cited

U.S. PATENT DOCUMENTS

| | | |
|---|---|---|
| 6,600,874 B1 | 7/2003 | Fujita et al. |
| 2010/0121636 A1 | 5/2010 | Burke et al. |
| 2012/0226502 A1* | 9/2012 | Ouchi .................. H04N 5/4403 704/275 |
| 2012/0239401 A1 | 9/2012 | Arakawa |
| 2012/0271636 A1 | 10/2012 | Fujisawa |

(Continued)

FOREIGN PATENT DOCUMENTS

| | | |
|---|---|---|
| JP | 2000-310993 A | 11/2000 |
| JP | 2003-295892 A | 10/2003 |

(Continued)

*Primary Examiner* — Farzad Kazeminezhad

(74) *Attorney, Agent, or Firm* — Knobbe, Martens, Olson & Bear, LLP

(57) ABSTRACT

In a speech recognition device according to one embodiment, a microphone detects sound and generates an audio signal corresponding to the sound, an adjustment processor adjusts a threshold to be a value less than a first volume level of first input audio signal generated by the microphone, and registers the adjusted threshold, a recognition processor reads the registered threshold, compares the registered threshold with a second input audio signal, discards the second input audio signal when a second volume level of the second input audio signal is less than the registered threshold, and performs a recognition process as the audio signal of a user to be recognized when the second volume level of the second input audio signal is greater than or equal to the registered threshold.

9 Claims, 8 Drawing Sheets

(56) References Cited

U.S. PATENT DOCUMENTS

| | | | | |
|---|---|---|---|---|
| 2015/0039305 A1* | 2/2015 | Huang | .................... | G10L 15/20 |
| | | | | 704/233 |
| 2016/0379673 A1 | 12/2016 | Chiyo et al. | | |
| 2017/0001561 A1* | 1/2017 | Christoph | .............. | B60Q 9/007 |
| 2018/0033430 A1* | 2/2018 | Kawano | .................. | G10L 15/22 |

FOREIGN PATENT DOCUMENTS

| | | |
|---|---|---|
| JP | 3753384 B2 | 3/2006 |
| JP | 2012-230191 A | 11/2012 |
| JP | 5538415 B2 | 7/2014 |
| JP | 2016-033530 A | 3/2016 |
| WO | WO 2011/070972 A1 | 6/2011 |

\* cited by examiner

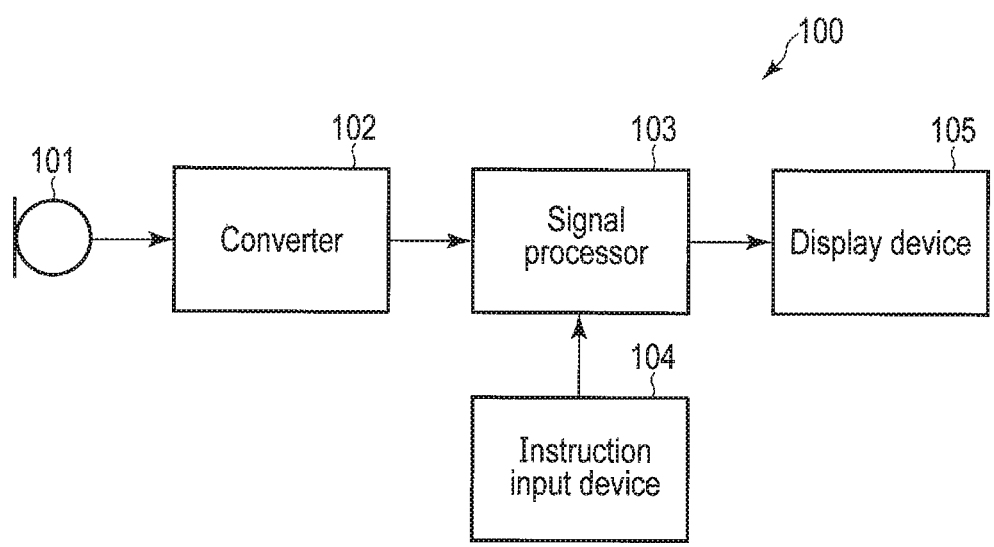
F I G. 1

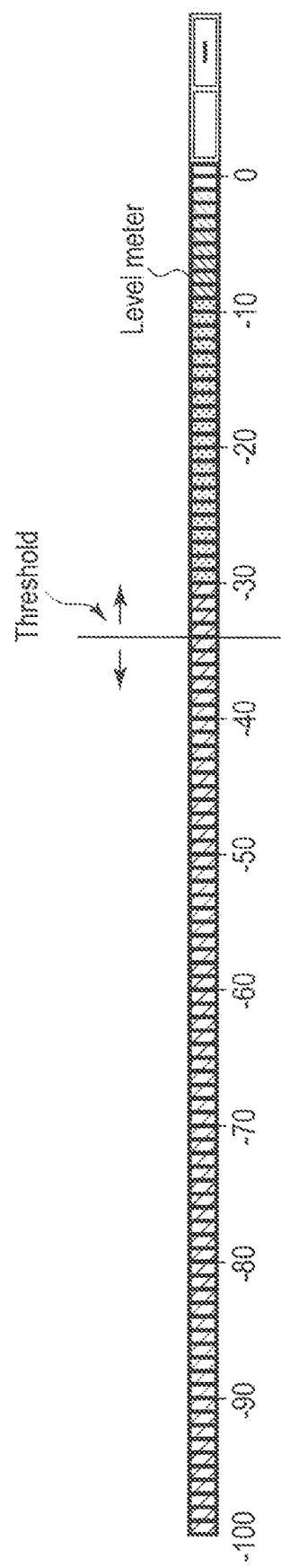
F I G. 7

SPEECH RECOGNITION DEVICE, SPEECH RECOGNITION METHOD AND STORAGE MEDIUM USING RECOGNITION RESULTS TO ADJUST VOLUME LEVEL THRESHOLD

CROSS-REFERENCE TO RELATED APPLICATIONS

This application is based upon and claims the benefit of priority from Japanese Patent Application No. 2017-054907, filed Mar. 21, 2017, the entire contents of which are incorporated herein by reference.

FIELD

Embodiments described herein relate generally to a speech recognition device, a speech recognition method and a storage medium.

BACKGROUND

Speech recognition devices have a function for recording and recognizing the speech of a target speaker with a microphone and converting the result of recognition into text (characters). However, it is difficult to distinguish background noise from speech depending on the environment. In particular, when the speech of more than one person is recorded, the speech may be difficult to obtain depending on the distance from the microphone or the direction of the microphone. Even when the speech of a single person is recorded, a sound which is not suitable for speech recognition may be included because of reverberation in a room or at a meeting. However, if a sound with a low volume is recorded to surely obtain speech, the differentiation from noise becomes more difficult.

As described above, the prior art has difficulty in appropriately setting the threshold of the volume for speech recognition in accordance with the environment.

Embodiments described herein aim to provide a speech recognition device, a speech recognition method and a storage medium capable of obtaining speech in the desired range for the user based on an interactive adjustment instruction with the user.

BRIEF DESCRIPTION OF THE DRAWINGS

FIG. 1 is a block diagram showing the configuration of a speech recognition device according to a first embodiment.

FIG. 7 is a conceptual diagram showing a display example of the speech recognition device according to the fourth embodiment.

DETAILED DESCRIPTION

Figure 2:
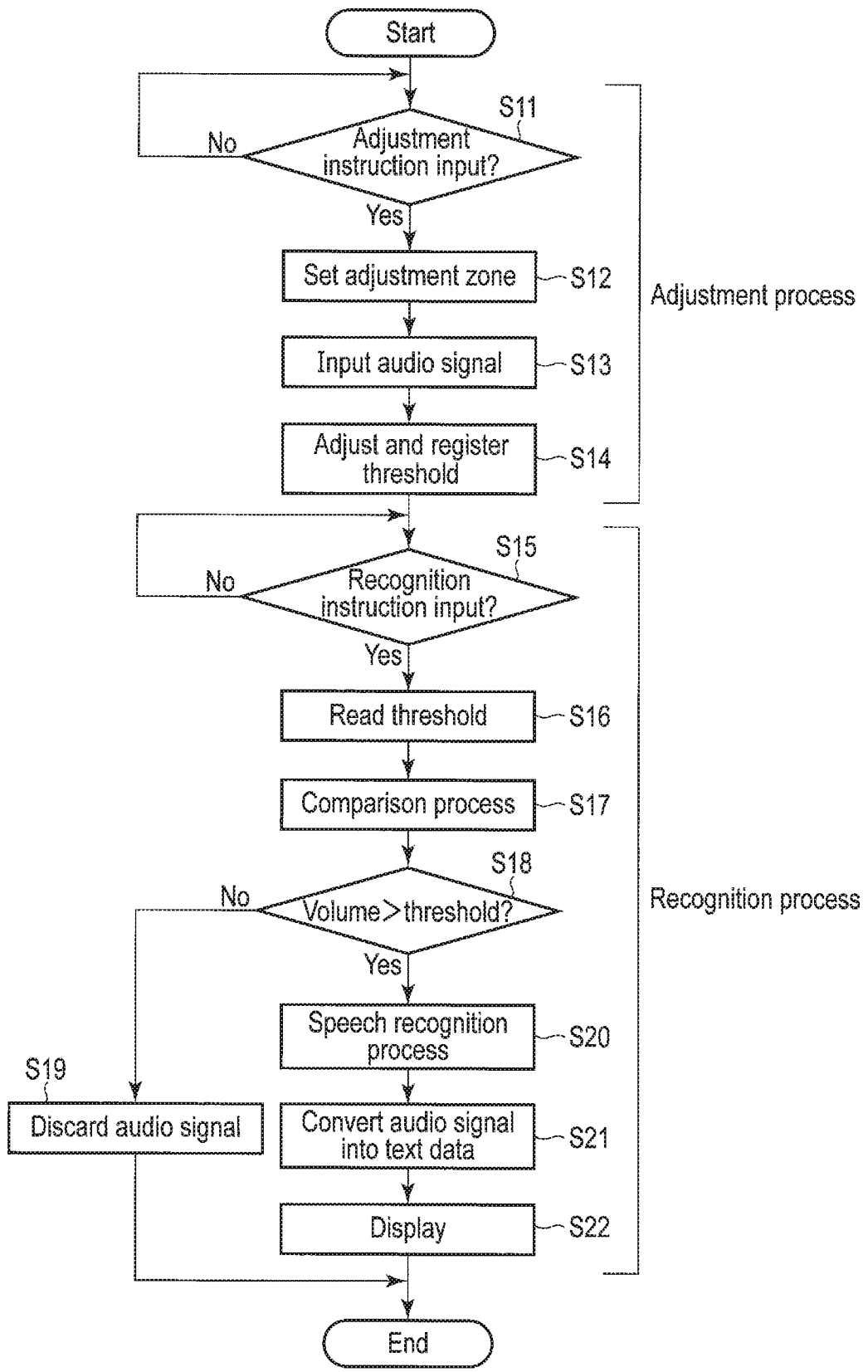
FIG. 2 is a flowchart showing the flow of the process of the speech recognition device according to the first embodiment.

In a speech recognition process, for example, by a method for setting a threshold based on the distance from the recorded point, an audio signal having a volume less than the threshold is cut. When an audio signal having a volume greater than or equal to the threshold is input, the speech of the signal is subjected to a recognition process. However, the threshold setting is sensitive depending on the environment. Thus, the threshold is not necessarily set to an appropriate value. In consideration of this problem, embodiments described herein provide a speech recognition device capable of obtaining speech in the desired range for the user based on an interactive adjustment instruction with the user.

Various embodiments will be described hereinafter with reference to the accompanying drawings.

In general, according to one embodiment, a speech recognition device comprises a microphone, an adjustment processor and a recognition processor. The microphone detects sound and generates an audio signal corresponding to the sound. The adjustment processor adjusts a threshold to be a value less than a first volume level of first input audio signal generated by the microphone in accordance with an adjustment instruction input, and registers the adjusted threshold. The recognition processor reads the registered threshold in accordance with a recognition instruction input, compares the registered threshold with a second input audio signal, discards the second input audio signal when a second volume level of the second input audio signal is less than the registered threshold, and performs a recognition process as the audio signal of a user to be recognized when the second volume level of the second input audio signal is greater than or equal to the registered threshold.

First Embodiment

FIG. 1 is a block diagram showing the configuration of a speech recognition device 100 according to a first embodiment. The speech recognition device converts an audio signal collected by a microphone 101 into a digital signal by a converter 102, and inputs the signal into a signal processor 103. The signal processor 103 compares the audio signal with a threshold based on various conditions in accordance with an instruction from an instruction input device 104, and cuts a signal component less than the threshold. Subsequently, the signal processor 103 applies speech recognition to the audio signal, converts the audio signal into text data, and causes a display device 105 to display the text data.

The speech recognition process of the sound recognition device 100 having the above structure is explained with reference to FIG. 2.

FIG. 2 is a flowchart showing the flow of the speech recognition process in the signal processor 103. The speech recognition process of the present embodiment includes an adjustment processing step and a recognition processing step.

In the adjustment processing step, the signal processor 103 waits for an adjustment instruction input from the instruction input device 104 (step S11). When an adjustment instruction input is received, the signal processor 103 sets an adjustment zone (step S12), extracts the audio signal of the adjustment zone (step S13), adjusts the threshold so as to be a value less than the volume level of the input audio signal and registers the adjusted threshold (step S14). In the recognition processing step, the signal processor 103 waits for a recognition instruction input from the instruction input device 104 (step S15). When a recognition instruction input is received, the signal processor 103 reads the registered threshold (step S16), compares the threshold with the input audio signal (step S17), and determines whether or not the volume level of the input audio signal is greater than the threshold (step S18). When the volume level of the input audio signal is less than the threshold, the signal processor 103 discards the input of the audio signal (step S19), and returns to step S18 to wait for the next recognition instruction input. When the volume level of the input audio signal is greater than the threshold, the signal processor 103 performs a recognition process as the audio signal of the speaker to be recognized (step S20), converts the audio signal into text data (step S21), and causes the display device 105 to display the text data (step S22).

In the above speech recognition process, the threshold is adjusted and registered for the input audio signal of the adjustment zone set by an adjustment instruction input. Thus, it is possible to perform speech recognition by eliminating the signals of noise having a volume less than the threshold and the signals of speech other than the target speaker and recording the audio signal of the target speaker with a volume greater than or equal to the threshold.

In the above embodiment, when the threshold is adjusted, an adjustment instruction input is used as the trigger to set the adjustment zone. However, when this input operation is performed, the guidance "please say something to adjust the threshold" may be output. The adjustment zone may be set after the notice of the guidance. Thus, the threshold may be adjusted for the input audio signal of the adjustment zone. Instead of an adjustment instruction input, a trigger word may be used. Specifically, a preset trigger word said by the speaker to be recognized may be detected. The threshold may be adjusted for the trigger word or an audio signal following the trigger word. For example, the nickname "AAA" is registered as the trigger word. When the audio signal "AAA, switch on the TV" is input, an adjustment process is activated in response to "AAA", and the threshold is adjusted by the audio signal "switch on the TV".

As the volume level in the present embodiment, the power of each predetermined period of the input, audio signal can be used. In addition, various indexes may be used. For example, the power of background noise in a nonspeech zone may be obtained. The ratio between the power of the input audio signal and the power of background noise may be used as the volume level. In this structure, even when the sensitivity of the microphone or the gain of the amplifier have been changed, the readjustment of the threshold is unnecessary. Alternatively, an index indicating voice likelihood such as an index indicating the periodicity of the input sound may be used in combination. When a vector in which a plurality of indexes are combined is used, the likelihood obtained by comparing the sound model learned by mixture gaussian distribution in advance with the vector may be used as the volume level. In this manner, the number of errors of extracting noise having a high volume as speech is reduced.

Second Embodiment

Now, this specification explains a speech recognition device according to a second embodiment. The speech recognition device of the present embodiment basically has the same structures as the speech recognition device of the first embodiment. Thus, the detailed description of the structures is omitted.

Figure 3:
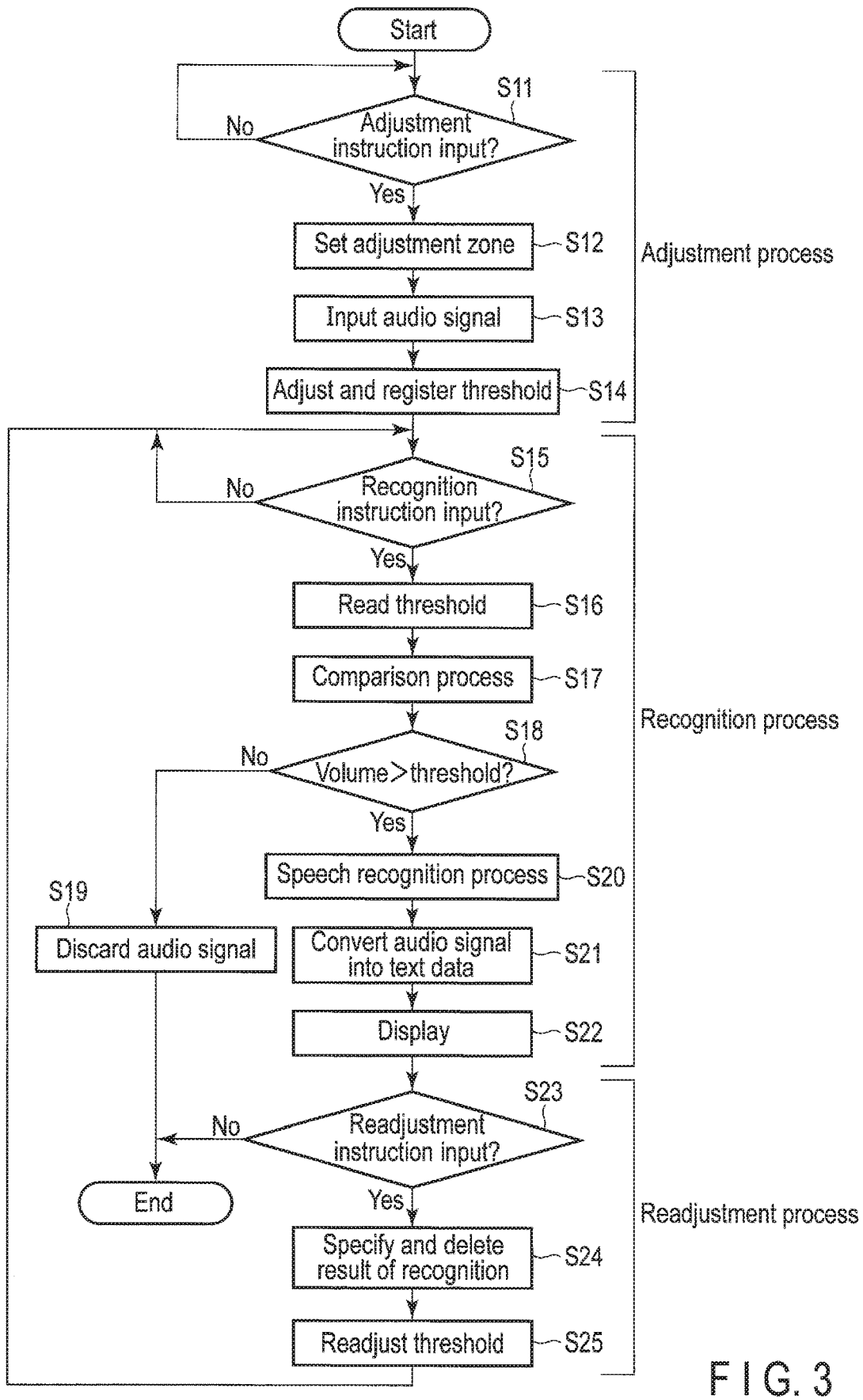
FIG. 3 is a flowchart showing the flow of the process of a speech recognition device according to a second embodiment.
Figure 4A:
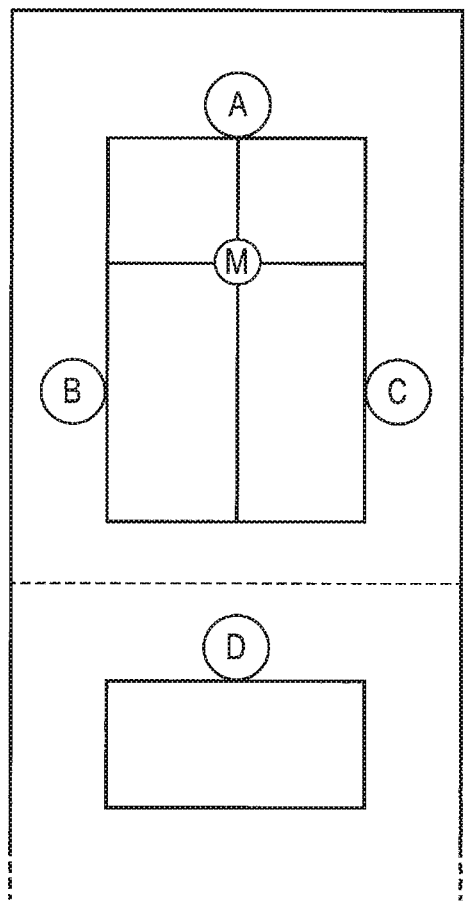
FIG. 4A and FIG. 4B are conceptual diagrams showing a specific example of the speech recognition device according to the second embodiment.
Figure 4B:
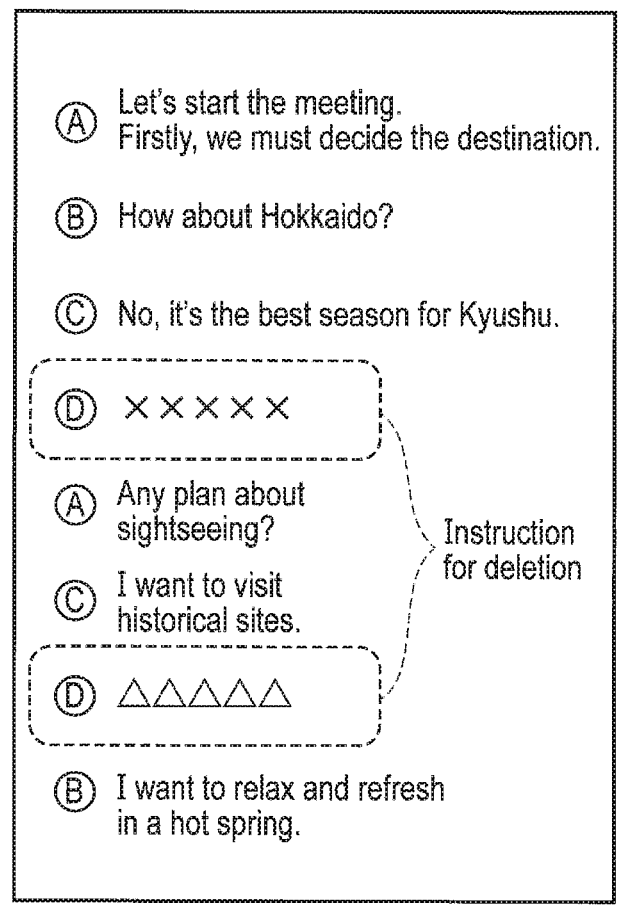

FIG. 3 is a flowchart showing the flow of a speech recognition process according to the present embodiment. FIG. 4A and FIG. 4B show a specific example. In FIG. 3, the same steps as the first embodiment shown in FIG. 2 are denoted by the same reference numbers. Different steps are explained below.

The present embodiment has a readjustment processing step. When the user sees the display content of the text data displayed on a display device 105 in step S22, and further when the result of recognition includes a sound which should not be recognized, an instruction for a readjustment process is issued through an instruction input device 103 (step S23). In the readjustment process, the speech recognition device waits for an input of an instruction for specifying and deleting the result of recognition of a sound which should not be recognized (step S24). When an instruction for deletion is received, the threshold is increased to the level at which the sound is not detected (step S25). In this way, in the speech recognition process, only the audio signal of the speaker to be recognized can be picked up and undergoes a speech recognition process.

FIG. 4A and FIG. 4B show a specific example. It is assumed that, while members A, B and C for planning a company trip have a meeting around a microphone M which is a speech recognition device as shown in FIG. 4A, the microphone M accidentally picks up the voice of a neighboring nonmember D.

It is assumed that the content of the meeting is displayed as text through speech recognition as shown in FIG. 4B. At this time, the speech of the neighboring nonmember D is also displayed as text. Since the speech recognition of the nonmember D is unnecessary, an instruction for a readjustment process is issued such that the text portions of the nonmember D are specified to be deleted. In this way, the threshold is increased to the level at which the speech of the nonmember D is not detected. Thus, the voice of the nonmember D is ignored in the conversation afterward.

Third Embodiment

Now, this specification explains a speech recognition device according to a third embodiment. The speech recognition device of the present embodiment basically has the same structures as the speech recognition device of the first embodiment. Thus, the detailed description of the structures is omitted.

Figure 5:
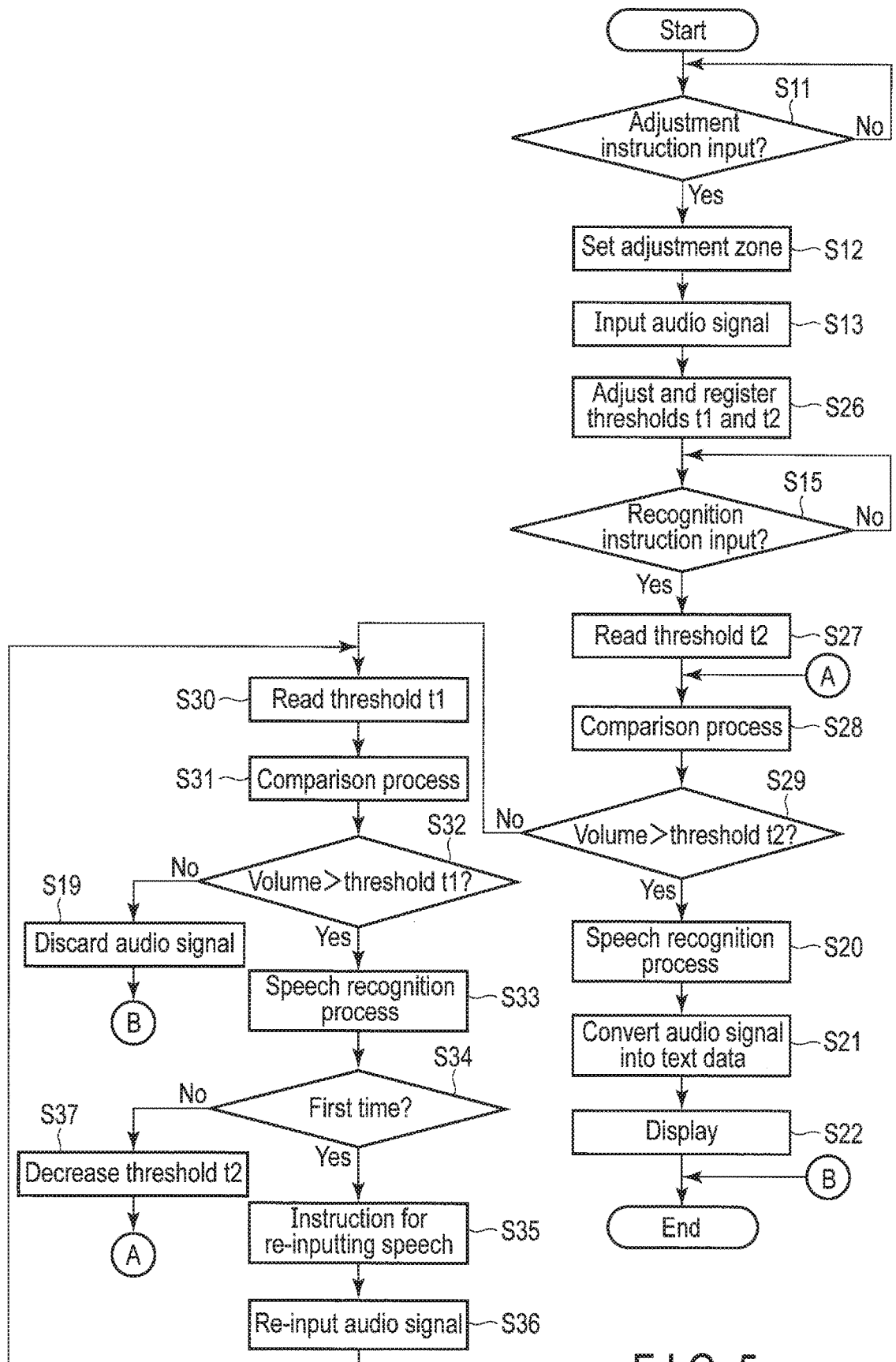
FIG. 5 is a flowchart showing the flow of the process of a speech recognition device according to a third embodiment.

FIG. 5 is a flowchart showing the flow of a speech recognition process according to the present embodiment. In FIG. 5, the same steps as the first embodiment shown in FIG. 2 are denoted by the same reference numbers. Different steps are explained below.

In the present embodiment, in an adjustment processing step, two thresholds (a first threshold t1 and a second threshold t2, where t1<t2) are prepared and registered (step S26) after step S13. When a recognition instruction input is performed in step S15, the second threshold t2 is read (step S27). The second threshold t2 is compared with the input audio signal (step S28). When the volume level of the input audio signal is greater than the second threshold t2, the process proceeds to the speech recognition process of step S20.

Further, in the present embodiment, when the volume level of the input audio signal is not greater than the second threshold t2 in step S29, the threshold is readjusted.

Specifically, the first threshold t1 is read (step S30). The first threshold t1 is compared with the input audio signal (step S31). When the volume level of the input audio signal is greater than the first threshold t1, a speech recognition process is performed (step S33). Whether or not the speech recognition process is the first time is determined (step S34). When the speech recognition process is the first time, an instruction for re-inputting speech is issued (step S35). When an audio signal is re-input (step S36), the process returns to step S30 to compare the audio signal with the first threshold t1. When the speech is recognition process is the second time in step 34, and further when the result of recognition has the same content as the first time, the second threshold t2 is decreased based on the determination that the speech is made again since the voice is too quiet to enter. Thus, the second threshold t2 is reregistered (step S37). The process proceeds to the comparison process of step S32. When the volume level is not greater than the first threshold t1 in step S32, the process proceeds to step S19 for discarding the input audio signal. The process is terminated.

When the second threshold t2 is decreased in step S37, an output operation may be performed by detecting a result greater than or equal to the threshold from the past results of recognition.

Fourth Embodiment

Now, this specification explains a speech recognition device according to a fourth embodiment. The speech recognition device of the present embodiment basically has the same structures as the speech recognition device of the first embodiment. Thus, the detailed description of the structures is omitted.

Figure 6:
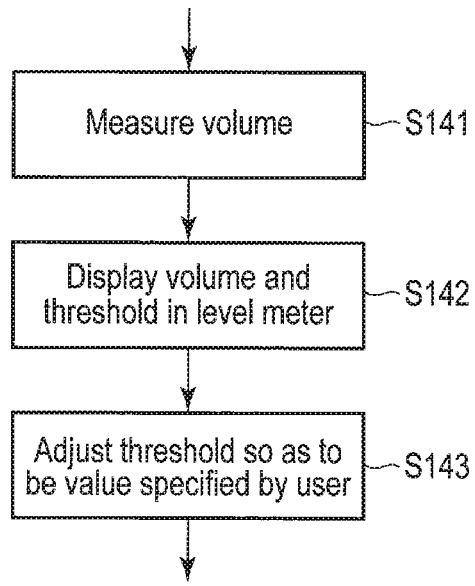
FIG. 6 is a flowchart showing the flow of the process of a speech recognition device according to a fourth embodiment.

FIG. 6 is a flowchart showing the flow of a speech recognition process according to the present embodiment. FIG. 7 is a display example. In FIG. 6, the same steps as the first embodiment shown in FIG. 2 are denoted by the same reference numbers. Different steps are explained below.

In the process for adjusting and registering the threshold (step S14), the present embodiment measures the volume of the input audio signal (step S141), displays a level meter indicating volume levels and the threshold on a display device 105 as shown in FIG. 7 (step S142), and adjusts the threshold so as to be the value specified by the user through an instruction input device 104 (step S143).

In this way, in the present embodiment, the level meter of the feature amount of speech and the threshold are displayed such that the user can adjust the threshold.

Fifth Embodiment

Now, this specification explains a speech recognition device according to a fifth embodiment. The speech recognition device of the present embodiment basically has the same structures as the speech recognition device of the first embodiment. Thus, the detailed description of the structures is omitted.

Figure 8:
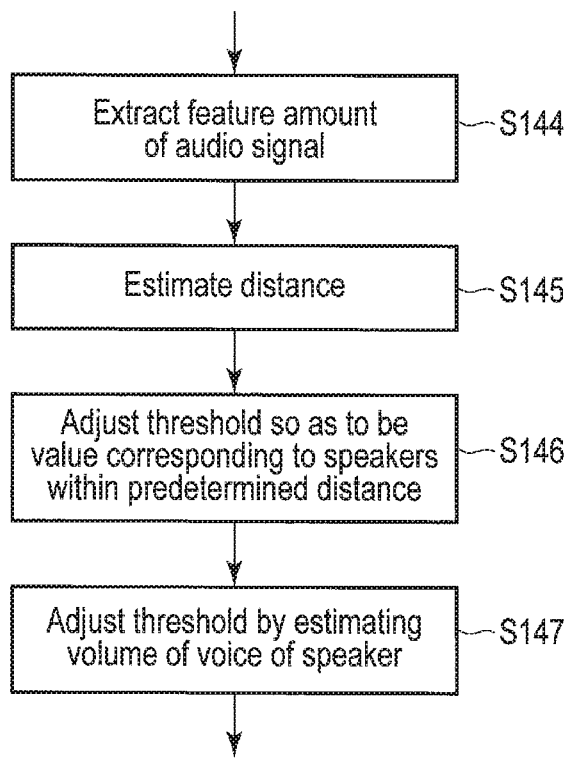
FIG. 8 is a flowchart showing the flow of the process of a speech recognition device according to a fifth embodiment.

FIG. 8 is a flowchart showing the flow of a speech recognition process according to the present embodiment. In FIG. 8, the same steps as the first embodiment shown in FIG. 2 are denoted by the same reference numbers. Different steps are explained below.

In the process for adjusting and registering the threshold (step S14), the present embodiment extracts the feature amount of the input audio signal (step S144), estimates the distance between a microphone 101 and the speaker from the feature amount (step S145), and adjusts the threshold so as to be a value for loading the audio signals of speakers within a predetermined distance (step S146). In this way, (1) only the voice of speakers close to the microphone 101 can be recognized. Further, the threshold is adjusted by estimating the volume of the voice of the speaker (step S147). In this way, (2) whether or not recognition is performed is determined by estimating the volume of the voice of the speaker. Thus, the whispered conversation of nearby speakers is not recognized.

As the feature amount of an audio signal, reverberant sound may be used. The ratio between direct sound and reverberant sound differs depending on the distance. In consideration of this fact, the distance can be estimated by measuring the volume of reverberant sound in combination with an acoustic processing device for eliminating reverberation (specifically, for eliminating rebounded audio signals from the recorded audio signals).

Figure 9:
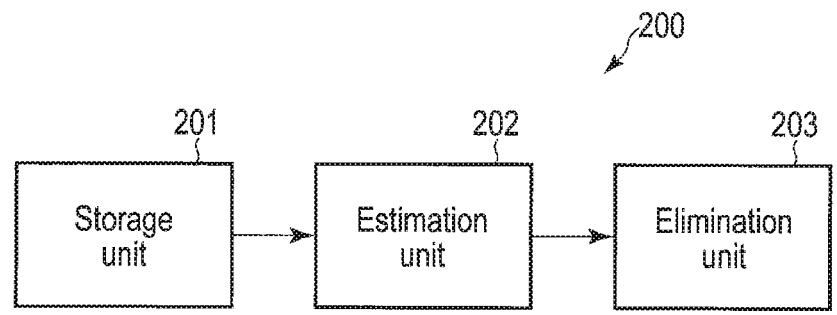
FIG. 9 is a block diagram showing the configuration of an acoustic processing device having a reverberation elimination function and useful in combination with the speech recognition device according to the fifth embodiment.

The specific configuration of the acoustic processing device for eliminating reverberation is shown in FIG. 9. The acoustic processing device 200 shown in FIG. 9 comprises a storage unit 201, an estimation unit 202 and an elimination unit 203. The storage unit. 201 stores a reference signal indicating a signal in which the elimination of reverberation is completed for a first observation signal included in a first processing zone. The estimation unit 202 estimates the filter coefficient of a reverberation elimination filter, using a second observation signal included in a second processing zone and the reference signal stored in the storage unit 201. This estimation of the filter coefficient is based on a model suitable for a situation in which sound is collected by the microphone distant from the sound source. This model is, for example, a model indicating an observation signal obtained by adding a signal in which reverberation is eliminated by applying a reverberation elimination filter to an acoustic signal input with a delay, and the acoustic signal. The elimination unit 203 obtains an output signal indicating a signal which reverberation is eliminated from the second observation signal, using the second observation signal, the reference signal, and the reverberation elimination filter having the estimated filter coefficient.

With respect to a situation in which sound is collected by the microphone distant from the sound source, the acoustic processing device having the above structure estimates a reverberation elimination filter and performs a reverberation elimination process using the estimated filter by a method in which the filter coefficient is not unstable based on a model corresponding to the physical phenomenon. In this way, the accuracy of the reverberation elimination process is improved. Reverberant sound can be effectively used as the feature amount for speech recognition.

As explained above, according to the first to fifth embodiments, the accuracy of a speech recognition process can be improved.

Figure 10:
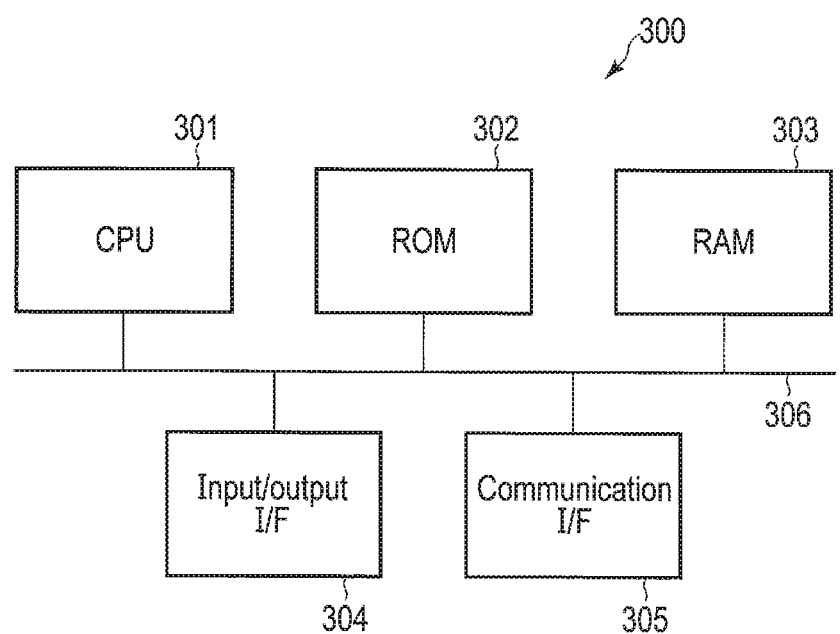
FIG. 10 is a block diagram showing a configuration when each speech recognition device of the first to fifth embodiments is realized by a computer device.

Now, this specification explains the hardware configuration of each speech recognition device of the first to fifth embodiments with reference to FIG. 10. FIG. 10 is a block diagram showing an example of the hardware configuration of each speech recognition device of the first to fifth embodiments.

Each speech recognition device of the first to fifth embodiments comprises a control device such as a central processing unit (CPU) 301, memory devices such as a read only memory (ROM) 302 and a random access memory (RAM) 303, the microphone 101, the operation input device 104, an input/output I/F 304 connected to the display device 105, a communication I/F 305 which performs communication through connection to a network, and a bus 306 connecting the elements.

A program executed in each speech recognition device of the first to fifth embodiments is provided by incorporating the program into the ROM 302, etc., in advance.

A program executed in each speech recognition device of the first to fifth embodiments may be provided as a computer program product by recording the program in a computer-readable recording medium such as a compact disk read only memory (CD-ROM), a flexible disk (FD), a compact disk recordable (CD-R) or a digital versatile disk (DVD) as a file in an installable format or an executable format.

Further, a program executed in each speech recognition device of the first to fifth embodiments may provided by storing the program on a computer connected to a network such as the Internet and downloading the program via the network. Alternatively, a program executed in each speech recognition device of the first to fifth embodiments may be provided or distributed via a network such as the Internet.

A program executed in each speech recognition device of the first to fifth embodiments may cause a computer to function as each element of the signal processing device. The computer is capable of executing the program when the CPU 301 reads the program from a computer-readable recording medium onto the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech recognition device comprising:
   a microphone which detects sound and generates an audio signal corresponding to the sound; and
   a signal processor which adjusts a threshold to be a value less than a first volume level of a first input audio signal generated by the microphone in accordance with an adjustment instruction input, and registers the adjusted threshold, reads the registered threshold in accordance with a recognition instruction input, compares the registered threshold with a second input audio signal, discards the second input audio signal when a second volume level of the second input audio signal is less than the registered threshold, and performs a recognition process as the audio signal of a user to be recognized when the second volume level of the second input audio signal is greater than or equal to the registered threshold, wherein the signal processor:
   prepares and registers a first threshold t1 and a second threshold t2, where t1≤t2,
   reads the second threshold t2,
   compares the second threshold t2 with the second input audio signal,
   proceeds to a speech recognition process when the second volume level of the second input audio signal is greater than the second threshold t2,
   when the second volume level of the second input audio signal is not greater than the second threshold t2, reads the first threshold t1 and compares the first threshold t1 with the second input audio signal,
   when the second volume level of the second input audio signal is greater than the first threshold t1, performs the speech recognition process to obtain a first speech recognition result, prompts the second input audio signal to be re-input, and compares the re-input audio signal with the first threshold t1,
   when a third volume level of the re-input audio signal is greater than the first threshold t1, performs the speech recognition process to obtain a second speech recognition result,
   when the first speech recognition result is equal to the second speech recognition result, decreases the second threshold t2 and registers the decreased second threshold t2, and
   when neither the second volume level of the second input audio signal nor the third volume level of the re-input audio signal is greater than the first threshold, discards the audio signal.

2. The speech recognition device of claim 1, wherein the signal processor extracts a feature amount of the first input audio signal, estimates a distance between the microphone and the user based on the feature amount, and adjusts the threshold so as to be a value for loading the audio signal of the user within a particular distance.

3. The speech recognition device of claim 2, wherein the distance between the microphone and the user is estimated based on a ratio between direct sound and reverberant sound.

4. The speech recognition device of claim 1, wherein the signal processor readjusts the registered threshold to discard a portion of the audio signal specified to be unnecessary based on a result of the recognition process of the recognition unit.

5. The speech recognition device of claim 1, wherein the signal processor measures the first volume of the first input audio signal, presents the first volume level and the threshold to a user, and adjusts the threshold so as to be a value specified by the user.

6. A speech recognition device comprising:
   a microphone which obtains a plurality of sounds; and
   a signal processor which recognizes at least one sound from the plurality of sounds in accordance with volume levels of each of the plurality of sounds obtained in a period specified by a user, wherein the signal processor:
   prepares and registers a first threshold t1 and a second threshold t2, where t1<t2,
   reads the second threshold t2,
   compares the second threshold t2 with an input audio signal,
   proceeds to a speech recognition process when the second volume level of the input audio signal is greater than the second threshold t2,
   when the second volume level of the input audio signal is not greater than the second threshold t2, reads the first threshold t1 and compares the first threshold t1 with the input audio signal,
   when the second volume level of the input audio signal is greater than the first threshold t1, performs the speech recognition process to obtain a first speech recognition result, prompts the input audio signal to be re-input, and compares the re-input audio signal with the first threshold t1, when a third volume level of the re-input audio signal is greater than the first threshold t1, performs the speech recognition process to obtain a second speech recognition result, when the first speech recognition result is equal to the second speech recognition result, decreases the second threshold t2 and registers the decreased second threshold t2, and when neither the second volume level of the input audio signal nor the third volume level of the re-input audio signal is greater than the first threshold, discards an audio signal generated from the at least one sound from the plurality of sounds.

7. The speech recognition device of claim 6, further comprising:
a user interface which presents a result of recognition of the plurality of sounds; and
a configuration processor which sets a first sound to be recognized based on a volume level of a second sound corresponding to a portion specified by the user of the result of the recognition.

8. A speech recognition device comprising:
a microphone which obtains a plurality of sounds;
a first user interface which outputs content for prompting a user to speak, and
a signal processor which recognizes at least one sound of the plurality of sounds in accordance with an audio level of speech of the user, wherein the signal processor:
prepares and registers a first threshold t1 and a second threshold t2, where t1<t2,
reads the second threshold t2,
compares the second threshold t2 with an input audio signal,
proceeds to a speech recognition process when the second volume level of the input audio signal is greater than the second threshold t2, when the second volume level of the input audio signal is not greater than the second threshold t2, reads the first threshold t1 and compares the first threshold t1 with the input audio signal, when the second volume level of the input audio signal is greater than the first threshold t1, performs the speech recognition process to obtain a first speech recognition result, prompts the input audio signal to be re-input, and compares the re-input audio signal with the first threshold t1, when a third volume level of the re-input audio signal is greater than the first threshold t1, performs the speech recognition process to obtain a second speech recognition result, when the first speech recognition result is equal to the second speech recognition result, decreases the second threshold t2 and registers the decreased second threshold t2, and when neither the second volume level of the input audio signal nor the third volume level of the re-input audio signal is greater than the first threshold, discards an audio signal generated from the at least one sound from the plurality of sounds.

9. The speech recognition device of claim 8, further comprising:
a second user interface which presents a result of recognition of the plurality of sounds; and
a configuration processor which sets a first sound to be recognized based on a volume level of a second sound corresponding to a portion specified by the user of the result of the recognition.

* * * * *